US005148516A

United States Patent [19]

Hassoun

[11] Patent Number: 5,148,516

[45] Date of Patent: Sep. 15, 1992

[54] EFFICIENT COMPUTER TERMINAL SYSTEM UTILIZING A SINGLE SLAVE PROCESSOR

[75] Inventor: Joseph H. Hassoun, Roseville, Calif.

[73] Assignee: Hewlett-Packard Company, Palo Alto, Calif.

[21] Appl. No.: 238,235

[22] Filed: Aug. 30, 1988

[51] Int. Cl.[5] .......... G06F 9/24

[52] U.S. Cl. .......... 395/100; 395/700; 364/DIG. 2; 364/237.3; 364/280.2; 364/230.4; 364/238.4

[58] Field of Search ... 364/200 MS File, 900 MS File, 364/518, 521, 132; 340/718, 720, 750, 789; 395/100, 700

[56] References Cited

U.S. PATENT DOCUMENTS

| | | | |
|---|---|---|---|
| 4,099,236 | 6/1978 | Goodman et al. | 364/200 |
| 4,148,066 | 4/1979 | Saylor | 364/521 |
| 4,237,543 | 12/1980 | Nishio et al. | 364/900 |
| 4,245,307 | 1/1981 | Kapeghian et al. | 364/200 |
| 4,384,285 | 5/1983 | Long et al. | 340/723 |
| 4,403,303 | 9/1983 | Howes . | |
| 4,414,645 | 11/1983 | Ryan et al. | 364/900 |
| 4,459,655 | 7/1984 | Willemin | 364/132 |
| 4,470,042 | 9/1984 | Barnich | 340/745 |
| 4,481,578 | 11/1984 | Hughes | 364/200 |
| 4,485,378 | 11/1984 | Matsui et al. | 340/750 |
| 4,494,191 | 1/1985 | Itoh | 364/200 |
| 4,504,828 | 3/1985 | Couper | 340/735 |
| 4,517,654 | 5/1985 | Carmean | 364/521 |
| 4,595,996 | 6/1986 | Morley | 364/900 |
| 4,608,632 | 8/1986 | Kummer | 364/200 |
| 4,613,945 | 9/1986 | Parker | 340/735 |
| 4,642,789 | 2/1987 | Lavelle | 364/900 |
| 4,646,261 | 2/1987 | Ng | 364/900 |
| 4,648,050 | 3/1987 | Yamagami | 340/703 |
| 4,661,812 | 4/1987 | Ikeda | 340/750 |
| 4,663,707 | 5/1987 | Dawson | 364/200 |
| 4,665,481 | 5/1987 | Stonier | 364/200 |
| 4,665,501 | 5/1987 | Saldin | 364/900 |
| 4,701,865 | 10/1987 | Goodman | 364/900 |
| 4,736,309 | 4/1988 | Johnson | 364/900 |
| 4,736,340 | 4/1988 | Desserrieres et al. | 364/900 |
| 4,737,772 | 4/1988 | Nishi | 340/703 |
| 4,737,779 | 4/1988 | Somigk | 340/745 |
| 4,740,882 | 4/1988 | Miller | 364/132 |
| 4,747,042 | 5/1988 | Ishii et al. | 364/200 |
| 4,752,427 | 6/1988 | Okayama | 364/132 |
| 4,757,441 | 7/1988 | Buckland | 364/200 |
| 4,772,883 | 9/1988 | Kitano | 340/748 |
| 4,787,026 | 11/1988 | Barnes | 364/200 |
| 4,789,854 | 12/1988 | Ishii | 340/703 |
| 4,827,254 | 5/1989 | Nishiyama | 340/735 |
| 4,833,624 | 5/1989 | Kuwahara | 364/132 |
| 4,837,737 | 6/1989 | Watanabe | 340/735 |
| 4,849,747 | 7/1989 | Ogawa | 340/735 |
| 4,851,994 | 7/1989 | Toda | 364/200 |
| 4,862,150 | 8/1989 | Katsura | 340/799 |
| 4,862,156 | 8/1989 | Westberg | 340/745 |
| 4,868,556 | 9/1989 | Murakami | 340/799 |
| 4,907,146 | 3/1990 | Capovali | 364/132 |
| 4,942,391 | 7/1990 | Kikuta | 340/745 |
| 4,958,147 | 9/1990 | Kanema | 340/703 |
| 4,965,559 | 10/1990 | Dye | 340/706 |
| 4,972,273 | 11/1990 | Burkhardt | 358/471 |

OTHER PUBLICATIONS

Intel, "Microprocessor and Peripheral Handbook", 1983 (pp. 6-306-6-329).

*Primary Examiner*—Thomas C. Lee
*Assistant Examiner*—Eric Coleman

[57] ABSTRACT

A CRT computer terminal is presented. The need for a master processor is eliminated by designing a CRT controller to initialize a slave processor. The slave processor accesses a random access memory (RAM) in which is stored instructions which the processor executes. Upon initialization of the computer terminal, the CRT controller reads instructions to be executed by the slave processor from a non-volatile read-only memory (ROM). The instructions are transferred from the CRT controller to the slave processor. The slave processor stores the instructions in the random access memory. Each instruction, at the proper time, may then retrieved and executed by the slave processor.

3 Claims, 2 Drawing Sheets

EFFICIENT COMPUTER TERMINAL SYSTEM UTILIZING A SINGLE SLAVE PROCESSOR

BACKGROUND OF THE INVENTION

The present invention relates to a cathode ray tube (CRT) computer terminal.

Once a CRT computer terminal has been designed for a particular terminal, a later redesign of compatible CRT computer terminals focuses on the reduction of design complexity, particularly as to number of chips required for assembly. The present invention allows the production of a logic section within a computer terminal to be implemented with the use of eight integrated circuits as compared with alternate designs which use from twelve to one hundred fifteen integrated circuits.

SUMMARY OF THE INVENTION

In accordance with the preferred embodiments of the present invention a cost-efficient design for a CRT computer terminal is presented. The need for a master processor is eliminated by designing a CRT controller to initialize a slave processor. The slave processor accesses a random access memory (RAM) in which is stored instructions which the processor executes. Upon initialization of the computer terminal, the CRT controller reads instructions to be executed by the slave processor from a non-volatile read-only memory (ROM). The instructions are transferred from the CRT controller to the slave processor. The slave processor stores the instructions in the random access memory. Each instruction, at the proper time, may then be retrieved and executed by the slave processor.

Further, in the preferred embodiment, the CRT controller includes a screen buffer and a row buffer. The screen buffer is sufficiently large to contain a display screen of data to be displayed on a CRT display. The row buffer contains two sections, each section containing a character row of data to be displayed on the CRT display. The character row in a first of the two sections is modified with information from the screen buffer. The character row in a second of the two sections is the character row currently being drawn on the CRT display. Upon a signal the sections are switched so that the character row in the second section is modified with information from the screen buffer and the character row in the first section is the character row currently being drawn on the CRT display.

DESCRIPTION OF THE PREFERRED EMBODIMENT

Figure 1:
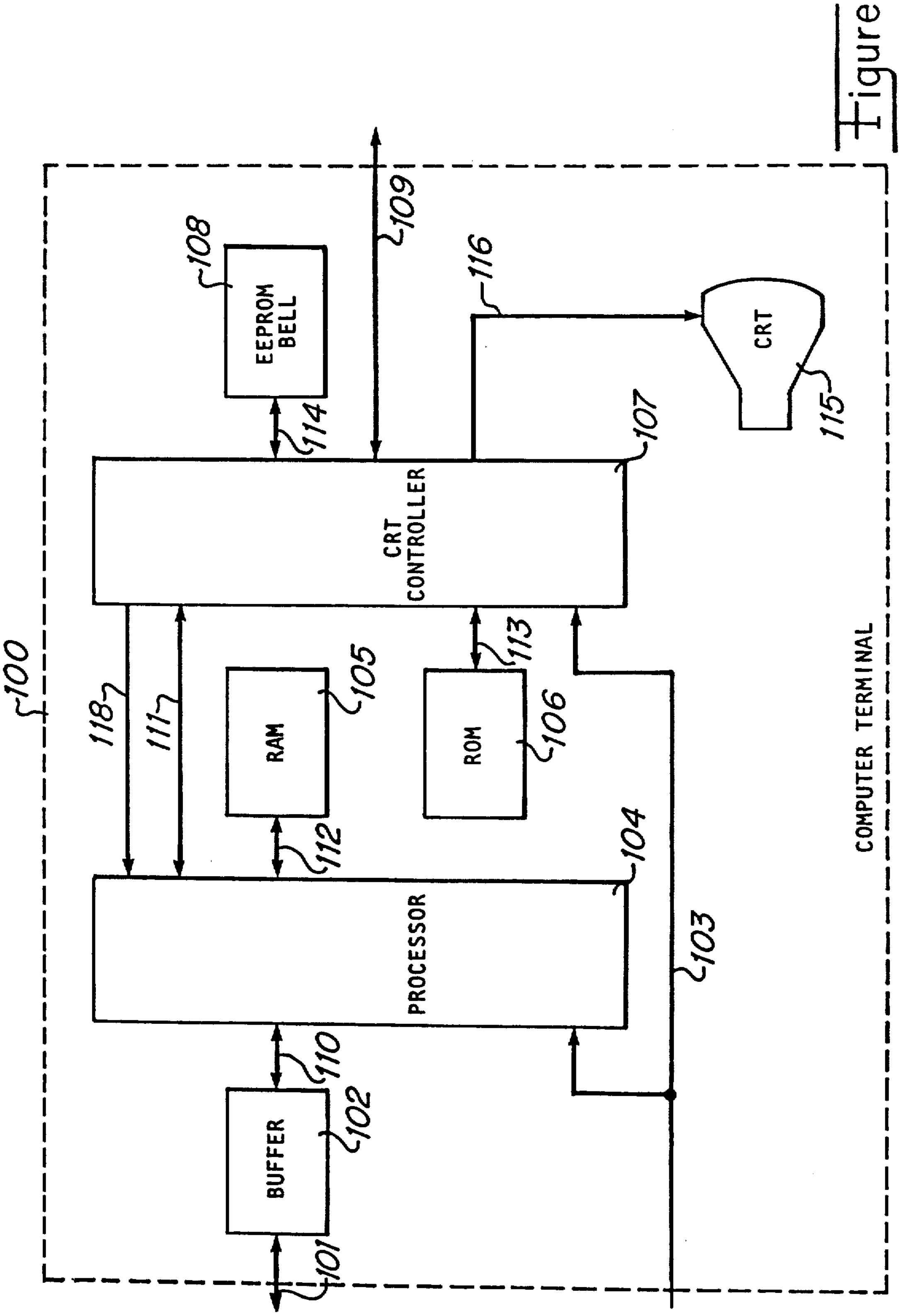
FIG. 1 is a block diagram of the logic design for a computer terminal in accordance with the preferred embodiment of the present invention.

FIG. 1 shows the logic design for a computer terminal 100. A coax cable 101 connects a computer (not shown) to a buffer 102 within computer terminal 100. Buffer 102 buffers data transferred between coax cable 101 and a processor 104. Data transferred between buffer 102 and processor 104 is sent over lines 110. Processor 104 is, for example, a Biphase Communication Processor developed by National Semiconductor Corporation, having a business address at 2900 Semiconductor Drive, Santa Clara, Calif. 95051. The Biphase Communication Processor is a slave processor requiring a master processor to initialize and control its operation. In the present invention a CRT controller 107 functions to perform the tasks typically done by a master processor.

Processor 104 accesses a random access memory (RAM) 105 through lines 112. Processor 104 communicates with CRT controller 107 through lines 111. Lines 118 are used by CRT controller 107 to control processor 104, when necessary, and to down load instructions to processor 104. CRT controller 107 accesses a read-only memory (ROM) 106 through lines 113. CRT controller 107 sends data to a CRT 115 through lines 116. CRT controller accesses an EEPROM and bell circuit 108 through lines 114 and a keyboard (not shown) through lines 109. A reset line 103, connected to processor 104 and CRT controller 107, is used to reset the system.

Figure 2:
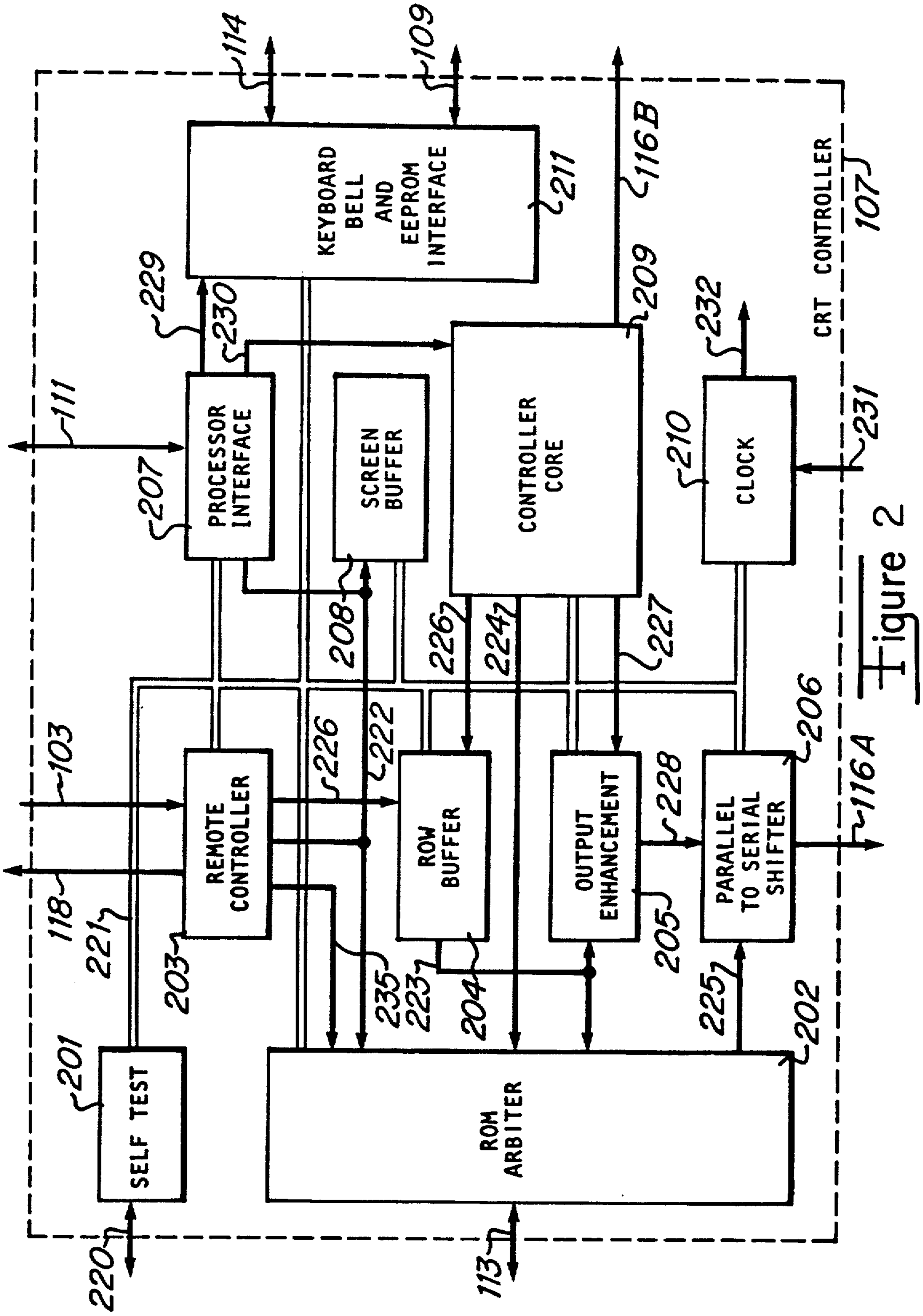
FIG. 2 is the block diagram of a CRT controller shown in FIG. 1, in accordance with the preferred embodiment of the present invention.

FIG. 2 shows a block diagram of CRT controller 107. A processor interface 207 communicates with processor 104 through lines 111. Processor interface 207 and all other blocks within CRT controller 107 are coupled to a data bus 221. Processor 104 generally exercises control over data bus 221 through processor interface 207.

Through an address bus 222, processor interface 207 communicates with a ROM Arbiter 202 and a screen buffer 208. Processor 104, through processor interface 207, controls a keyboard, bell and EEPROM interface 211 through lines 229. Processor 104 also sends control signals through processor interface 107, through lines 230 to a controller core 209. Processor interface 107 decodes addresses sent from processor 104.

Screen buffer 208 holds 2K bytes of data, sufficient for one screen of data. The data in screen buffer 208 is from processor 104, transferred through data bus 221, to screen buffer 208. The data in screen buffer 208 is read by a remote controller 203 through data bus 221.

Remote controller 203 has two functions. Each function is performed by a state machine within remote controller 203. Upon system reset, remote controller 103 receives a reset signal over reset line 103. Remote controller 203 then acts as an instruction down loader to processor 104. Through address lines 235 remote controller 203 causes ROM arbiter to retrieve data from ROM 106. ROM arbiter 202 returns the retrieved data to remote controller 203 through data bus 221. Through lines 118, remote controller 203 drives the control lines of processor 104, and writes instructions through processor 104 to RAM 105. Once this is complete, control is handed to processor 104 which begins normal firmware execution. The instructions in RAM 105 are used to control processor 104.

The second function of remote controller 203 is to oversee the transfer of one character row of data (fifteen scan lines) from screen buffer 208 to a row buffer 204. Once every six microseconds, remote controller 203, through lines 118, instructs processor 104 to relinquish control over data bus 221. Remote controller 203 then sends to row buffer 204 through address lines 226 the address within screen buffer 208 of the one row of data to be sent to row buffer 204. Remote controller 203 then controls address lines 222 to direct the transfer of this character row from screen buffer 208 to row buffer 204.

Row buffer 204 contains two sections. Each section has enough memory to store one character row of data.

In a first section, one character row is constantly being read through lines 223 by ROM arbiter 202 and an output enhancement block 205 for the purpose of sending data to CRT 115 to be displayed. In the second section, a character row of data is available for update by remote controller 203. When CRT 115 has completed fifteen scan lines (1 character row), the two sections are switched so that the second section is read by ROM arbiter 202 and output enhancement block 205 and the first section is available for update by remote controller 203.

ROM arbiter 202 interfaces with ROM 106 through lines 113. For instance, ROM arbiter 202 receives through lines 223 a character from row buffer 204 and receives through lines 224 a scan line number from a controller core 209. With this information ROM arbiter 202 generates an address for the location in ROM 113 of the dot pattern for the scan line of the character received. The ROM address is sent through lines 113 to ROM 106. ROM 106 returns through lines 113 the dot pattern to ROM arbiter 202. ROM arbiter 202 sends the dot pattern to a parallel-to-serial shifter 206 through lines 225.

The character sent to ROM arbiter 202 from row buffer 204 is also sent through lines 223 to an output enhancement block 205. Output enhancement block 205 notes any enhancement, e.g., underlining, italics, bold, etc., and sends an enhancement control signal to shifter 206 through lines 228. Parallel-to-serial shifter 206 receives input from ROM arbiter 202 and enhancement control signals from output enhancement block 205 and converts this information to a serial transmission which is sent to CRT 115 through lines **116*a*. Lines 116*a* are a subset of lines 116**.

A keyboard, bell and EEPROM interface 211 interfaces with a keyboard through lines 109. Keyboard, bell and EEPROM interface interfaces with EEPROM and bell 108 through lines 114. Processor 104 is able to access keyboard, bell and EEPROM interface 111 through processor interface 207 through lines 229.

Controller core 209 provides control and timing for all blocks within CRT controller 107. Controller core 209 keeps track of data displayed on CRT 115, e.g., which row is being scanned, which scan line is being scanned, which character is currently being reproduced. Controller core 209 also informs row buffer 204 through lines 226, when to switch sections. Controller core 209 also generates horizontal synchronization signals and vertical synchronization signals which are sent to CRT 115 through lines **116*b*. Lines 116*b* are a subset of lines 116. These signals are used, for example, to fill in blank spots in the display. Further, controller core 209 sends timing information to output enhancement block 205 through lines 227**.

A clock 210 receives a system clock signal through a clock line 231 and generates a clock signal placed on a clock line 232 which is connected to and used by all blocks in CRT controller 107.

A self test block 201 is accessible to tester circuitry through lines 220. Self test block 201 is used to test operation of CRT controller 107 for manufacturing and other defects.

I claim:

1. A computer terminal comprising:

a CRT display;

a slave processor;

random access memory coupled to the slave processor and accessible only by the slave processor;

non-volatile read-only memory; and

CRT control means, coupled to the CRT display, to the non-volatile read-only memory and to the slave processor, for sending display information to the CRT display and for sending control signals to the slave processor, the CRT control means including means for, upon an initialization of the computer terminal, down loading programming code for execution by the slave processor from the non-volatile read-only memory through the slave processor the random access memory, a screen buffer with sufficient memory to contain data for a full screen to be displayed on the CRT display, processor interface means, coupled to the screen buffer, for interfacing with the slave processor and placing data from the slave processor into the screen buffer, row buffer with sufficient memory to contain two character rows of CRT screen display, and remote controller means, coupled to the screen buffer and to the row buffer, for transferring one character row of screen display from the screen buffer to the row buffer, the remote controller means being coupled directly to the slave processor and to a reset line, and the remote controller means including a state machine which upon receipt of a reset signal over the reset line causes programming code for execution by the slave processor from the read-only memory to be transferred from the read-only memory to the slave processor.

2. In a computer terminal having a slave processor, a read-only memory and a CRT display, a CRT controller comprising:

a screen buffer with sufficient memory to contain data for a full CRT screen display of data;

processor interface means, coupled to the screen buffer, for interfacing with the slave processor and placing data from the slave processor into the screen buffer;

row buffer with sufficient memory to contain two character rows of CRT screen display, the row buffer including two sections, each section containing one of the two character rows, so that a first of the two sections may receive one character row of screen display from the screen buffer while a second of the two sections is read to supply display information to the CRT display; and, remote controller means, coupled to the screen buffer and to the row buffer, for transferring one character row of screen display from the screen buffer to the row buffer, wherein the remote controller means being coupled directly to the slave processor and to a reset line, and the remote controller means includes a state machine which upon receipt of a signal over the reset line causes data from the read-only memory to be transferred from the read-only memory to the slave processor.

3. A CRT controller as in claim 2 wherein upon a signal the first section and the second section switch so that the second section receives the one character row of screen display from the screen buffer and the first section is read from to supply display information to the CRT display.

* * * * *